United States Patent
Ye et al.

(10) Patent No.: US 10,980,086 B2
(45) Date of Patent: Apr. 13, 2021

(54) SUPPORT OF 64 QAM FOR EFEMTC PDSCH TRANSMISSION

(71) Applicant: APPLE INC., Cupertino, CA (US)

(72) Inventors: Qiaoyang Ye, San Jose, CA (US); Debdeep Chatterjee, San Jose, CA (US); Salvatore Talarico, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/465,998

(22) PCT Filed: Mar. 23, 2018

(86) PCT No.: PCT/US2018/024038
§ 371 (c)(1),
(2) Date: May 31, 2019

(87) PCT Pub. No.: WO2018/175896
PCT Pub. Date: Sep. 27, 2018

(65) Prior Publication Data
US 2020/0163156 A1    May 21, 2020

Related U.S. Application Data

(60) Provisional application No. 62/476,039, filed on Mar. 24, 2017.

(51) Int. Cl.
*H04L 1/00* (2006.01)
*H04W 88/06* (2009.01)
(Continued)

(52) U.S. Cl.
CPC ............ *H04W 88/06* (2013.01); *H04L 1/003* (2013.01); *H04L 1/0003* (2013.01);
(Continued)

(58) Field of Classification Search
CPC ............ H04W 72/042; H04W 72/0446; H04L 5/0053; H04L 5/0051; H04L 5/0055
See application file for complete search history.

(56) References Cited

U.S. PATENT DOCUMENTS

2015/0117396 A1* 4/2015 Wang ................... H04L 5/0091
                                                        370/330
2016/0081093 A1* 3/2016 Hugl ................ H04W 72/0466
                                                        370/329
(Continued)

OTHER PUBLICATIONS

3GPP TSG RAN WG1 #88 ("RAN1 agreements for Rel-14 FeMTC"; Agenda Item: 7.2.3; Ericsson; Feb. 13, 2017; Athens, Greece) (Year: 2017).*

(Continued)

*Primary Examiner* — Jamal Javaid

(57) ABSTRACT

Technology for a user equipment (UE), configured for coverage enhanced (CE) machine type communication (MTC) is disclosed. The UE can encode, at the UE, a UE capability message for transmission to a next generation node B (gNB) or evolved Node B (eNB), wherein the UE capability message includes a capability to support communication using a modulation and coding scheme (MCS) that includes 64 quadrature amplitude modulation (QAM). The UE can decode, at the UE, a higher layer signaling message to configure the UE to operate in a CE mode A. The UE can decode, at the UE, data received in a physical downlink shared channel (PDSCH) transmission to the UE that is modulated using a 64 QAM.

26 Claims, 9 Drawing Sheets

| CQI index | modulation | code rate x 1024 x $R^{CSI}$ | efficiency x $R^{CSI}$ |
|---|---|---|---|
| 0 | out of range | | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | Reserved | Reserved | Reserved |
| 12 | Reserved | Reserved | Reserved |
| 13 | Reserved | Reserved | Reserved |
| 14 | Reserved | Reserved | Reserved |
| 15 | Reserved | Reserved | Reserved |

(51) Int. Cl.
*H04W 4/70* (2018.01)
*H04L 27/00* (2006.01)
*H04L 27/36* (2006.01)
*H04W 8/24* (2009.01)

(52) U.S. Cl.
CPC ........ *H04L 27/0008* (2013.01); *H04L 27/361* (2013.01); *H04W 4/70* (2018.02); *H04W 8/24* (2013.01)

(56) References Cited

U.S. PATENT DOCUMENTS

2017/0288808 A1* 10/2017 Blankenship ......... H04L 1/0016
2017/0366377 A1* 12/2017 Papasakellariou ..........................
H04L 27/2613

OTHER PUBLICATIONS

R1-152507: 3GPP TSG RAN WG1 #81: CSI definition for MTC; Agenda Item: 6.2.1.5; Ericsson; May 25-29, 2015; Fukuoka, Japan.
R1-1704131: 3GPP TSG RAN WG1 #88: RAN1 agreements for Rel-14 FeMTC; Agenda Item: 7.2.3; Ericsson; Feb. 13-17, 2017; Athens, Greece.

* cited by examiner

| CQI index | modulation | code rate x 1024 x $R^{CSI}$ | efficiency x $R^{CSI}$ |
|---|---|---|---|
| 0 | out of range | | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | Reserved | Reserved | Reserved |
| 12 | Reserved | Reserved | Reserved |
| 13 | Reserved | Reserved | Reserved |
| 14 | Reserved | Reserved | Reserved |
| 15 | Reserved | Reserved | Reserved |

FIG. 1

| CQI index | modulation | code rate x 1024 x $R^{CSI}$ | efficiency x $R^{CSI}$ |
|---|---|---|---|
| 0 | out of range | | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

FIG. 2

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 3

SUPPORT OF 64 QAM FOR EFEMTC PDSCH TRANSMISSION

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 1 illustrates a 4-bit channel quality indicator (CQI) table for release 13 (Rel-13) enhanced machine type communications (eMTC), in accordance with an example;

FIG. 2 illustrates a 4-bit channel quality indicator (CQI) table for cases within 64 Quadrature Amplitude Modulation (QAM), in accordance with an example;

FIG. 3 illustrates a 4-bit channel quality indicator (CQI) table for legacy long term evolution (LTE), in accordance with an example;

Figure 4:
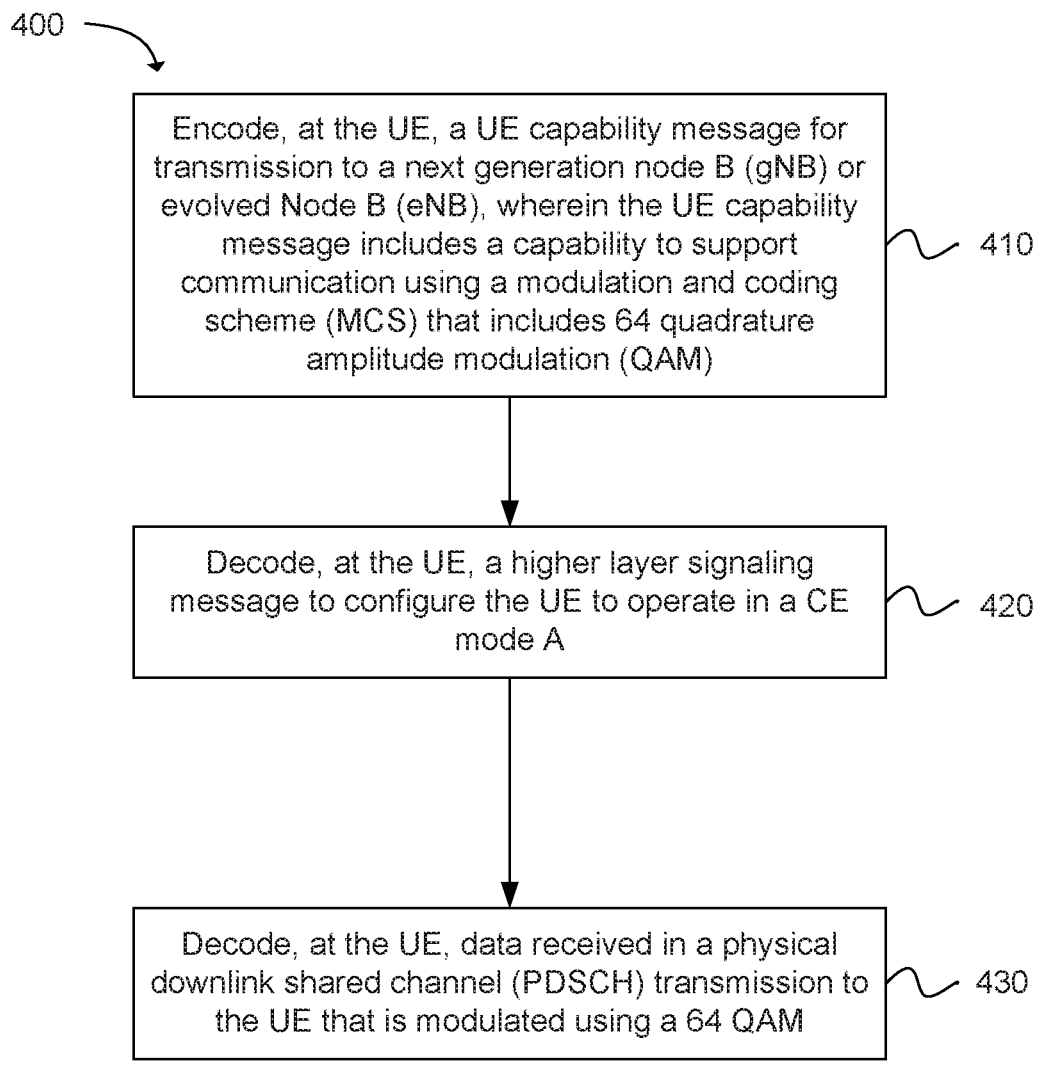
FIG. 4 depicts functionality of a user equipment (UE), configured for coverage enhanced (CE) machine type communication (MTC), in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The disclosed embodiments are related to release 15 (Rel-15) even further enhanced machine type communications (efeMTC). In release 13 (Rel-13) enhanced machine type communications (MTC) and release 14 (Rel-14) further enhanced MTC (feMTC), the modulation supported for physical downlink shared channel (PDSCH) is Quadrature Phase Shift Keying (QPSK) and 16 Quadrature Amplitude Modulation (QAM). Specifically, QPSK and 16 QAM are supported for the PDSCH in coverage enhancement (CE) mode A, and only QPSK is supported in CE mode B. For broadcasting information transmitted on the PDSCH, such as system information (SI), random access response (RAR) and paging, QPSK is solely used. Table 1 below provides the MCS table for Rel-13 eMTC PDSCH in CE mode A for Bandwidth-reduced Low-complexity or Coverage Enhanced (BL/CE).

TABLE 1

Illustration of MCS table for PDSCH of BL/CE UEs in CE mode A

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |

Additionally, to increase the spectral efficiency, one objective in Rel-15 efeMTC is to support 64 QAM for unicast PDSCH. In accordance with one embodiment, a design is disclosed for modulation and coding schemes (MCS), transport block sizes (TBS), and the impact on downlink control information (DCI) and the channel quality indicator (CQI) table to support 64 QAM for unicast PDSCH.

64 Quadrature Amplitude Modulation Configuration

In one example, the support of 64 QAM is indicated by the UE via capability signaling. Until such capability information is received, the eNB or gNB may not configure a UE for PDSCH scheduling with support of 64QAM. Further, 64QAM may only be used for the PDSCH carrying unicast messages.

In one embodiment, the 64 QAM can be semi-statically configured via higher layer signaling.

In one embodiment, the 64 QAM may only be supported in CE Mode A.

In another embodiment the support of 64QAM can depend on the repetition number used for the PDSCH and machine type communication physical downlink control channel (MPDCCH). For example, the 64 QAM may only be supported when the number of repetitions for PDSCH is 1. In addition, the UE may not expect 64QAM MCS usage if the maximum number of MPDCCH repetitions in the UE-specific search space (UESS), Rmax, is greater than a predefined integer N, e.g. N=8. In another example, the 64 QAM may only be supported when the number of repetitions for machine type communication (MTC) physical downlink control channel (MPDCCH) and PDSCH is 1.

In one embodiment Rmax may not be the repetition number included in the DCI. It can instead be a parameter configured by higher layers. In addition, the repetition number included in the DCI for MPDCCH is not more than Rmax.

Modulation and Coding Scheme (MCS) Design

In one example, the MCS table can be extended, where 1 additional bit is added to the MCS field in the DCI for the indication of the MCS. Accordingly, when configured with PDSCH scheduling with support of 64QAM, the UE can expect the MCS field in the DCI format 6-1A to have a length 5 bits instead of 4 bits. The corresponding impact on DCI size is further discussed in the DCI design section in the proceeding paragraphs.

In one example, in addition to the previously disclosed Table 1, the existing MCS table in 3GPP Rel. 15 can be reused as illustrated in Table 2, below. In this example, the MCS table for PDSCH can be redesigned with 5 bits to support 64 QAM with an MCS index of up to 31 entries.

TABLE 2

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |

TABLE 2-continued

| MCS Index $I_{MCS}$ | Modulation Order $Q_m$ | TBS Index $I_{TBS}$ |
| --- | --- | --- |
| 28 | 6 | 26/26A |
| 29 | 2 | reserved |
| 30 | 4 | |
| 31 | 6 | |

In one example, the same number of bits can be used for the MCS field as in the legacy 3GPP Rel-14 feMTC DCI table, i.e. 4 bits. The MCS table can be re-designed, by removing certain rows and adding the same number of rows to cover 64 QAM.

In another embodiment Table 3A and Table 3B, displayed below, show two examples of this alternative, where examples of MCS tables for PDSCH, supporting 64 QAM, with an MCS index up to 15 (i.e. 4 bits), are provided.

TABLE 3A

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | ~~2~~ 4 | 5 |
| 6 | ~~2~~ 4 | 6 |
| 7 | ~~2~~ 4 | 7 |
| 8 | ~~2~~ 4 | 8 |
| 9 | ~~2~~ 4 | 9 |
| 10 | ~~4~~ 6 | 9 |
| 11 | ~~4~~ 6 | 10 |
| 12 | ~~4~~ 6 | 11 |
| 13 | ~~4~~ 6 | 12 |
| 14 | ~~4~~ 6 | 13 |
| 15 | ~~4~~ 6 | 14 |

TABLE 3B

| MCS Index $I_{MCS}$ | Modulation Order $Q_m$ | TBS Index $I_{TBS}$ |
| --- | --- | --- |
| 0 | 2 | 0 |
| 1 | 2 | ~~1~~ 2 |
| 2 | 2 | ~~2~~ 4 |
| 3 | 2 | ~~3~~ 5 |
| 4 | 2 | ~~4~~ 7 |
| 5 | 2 | ~~5~~ 9 |
| 6 | ~~2~~ 4 | ~~6~~ 9 |
| 7 | ~~2~~ 4 | ~~7~~ 11 |
| 8 | ~~2~~ 4 | ~~8~~ 13 |
| 9 | ~~2~~ 4 | ~~9~~ 15 |
| 10 | ~~4~~ 6 | ~~9~~ 17 |
| 11 | ~~4~~ 6 | ~~10~~ 19 |
| 12 | ~~4~~ 6 | ~~11~~ 21 |
| 13 | ~~4~~ 6 | ~~6~~ 22 |
| 14 | ~~4~~ 6 | ~~6~~ 24 |
| 15 | ~~4~~ 6 | ~~6~~ 26 |

In the first example, Table 3A, the max TBS index is still 14, which is the same as 3GPP Rel-13 eMTC.

In the second example, Table 3B, the max TBS index is 26. In some embodiments, any set of integers within {0, 1, . . . , 26} can be selected to the MCS table. Other examples with different value of modulation order and TBS corresponding to a MCS index are not excluded.

Transport Block Size (TBS) Design

In one example of a TBS design, a max downlink (DL) TBS can be denoted by M. If the TBS corresponding to the indicated MCS index and number of PRBs by reading the existing TBS table. For example, an example TBS table, Table 4, illustrated below. The 3GPP Technical Specification includes a similar table in the 36.213 3GPP Technical specification, (i.e., Table 7.1.7.2.1-1 in 3GPP TS 36.213 Rel-13). The value M, denoted in bits, can be determined from the table based on a TBS indicator, $I_{TBS}$, and a number of physical resource blocks, $N_{PRB}$. A UE can be configured with a maximum number M. When the value in the table exceeds the predetermined number M, the UE may interpret the value in the table as M. Alternatively, the UE may drop the reception of this PDSCH, and consider this as an error case when the value in the table exceeds M.

TABLE 4

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |
| 26A | 632 | 1288 | 1928 | 2600 | 3240 | 3880 | 4584 | 5160 | 5992 | 6456 |

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2536 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |
| 26A | 7224 | 7736 | 8504 | 9144 | 9912 | 10296 | 11064 | 11832 | 12576 | 12960 |

TABLE 4-continued

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 0 | 568 | 600 | 616 | 648 | 680 | 712 | 744 | 776 | 776 | 808 |
| 1 | 744 | 776 | 808 | 872 | 904 | 936 | 968 | 1000 | 1032 | 1064 |
| 2 | 936 | 968 | 1000 | 1064 | 1096 | 1160 | 1192 | 1256 | 1288 | 1320 |
| 3 | 1224 | 1256 | 1320 | 1384 | 1416 | 1480 | 1544 | 1608 | 1672 | 1736 |
| 4 | 1480 | 1544 | 1608 | 1736 | 1800 | 1864 | 1928 | 1992 | 2088 | 2152 |
| 5 | 1864 | 1928 | 2024 | 2088 | 2216 | 2280 | 2344 | 2472 | 2536 | 2664 |
| 6 | 2216 | 2280 | 2408 | 2472 | 2600 | 2728 | 2792 | 2984 | 2984 | 3112 |
| 7 | 2536 | 2664 | 2792 | 2984 | 3112 | 3240 | 3368 | 3368 | 3496 | 3624 |
| 8 | 2984 | 3112 | 3240 | 3368 | 3496 | 3624 | 3752 | 3880 | 4008 | 4264 |
| 9 | 3368 | 3496 | 3624 | 3752 | 4008 | 4136 | 4264 | 4392 | 4584 | 4776 |
| 10 | 3752 | 3880 | 4008 | 4264 | 4392 | 4584 | 4776 | 4968 | 5160 | 5352 |
| 11 | 4264 | 4392 | 4584 | 4776 | 4968 | 5352 | 5544 | 5736 | 5992 | 5992 |
| 12 | 4776 | 4968 | 5352 | 5544 | 5736 | 5992 | 6200 | 6456 | 6712 | 6712 |
| 13 | 5352 | 5736 | 5992 | 6200 | 6456 | 6712 | 6968 | 7224 | 7480 | 7736 |
| 14 | 5992 | 6200 | 6456 | 6968 | 7224 | 7480 | 7736 | 7992 | 8248 | 8504 |
| 15 | 6456 | 6712 | 6968 | 7224 | 7736 | 7992 | 8248 | 8504 | 8760 | 9144 |
| 16 | 6712 | 7224 | 7480 | 7736 | 7992 | 8504 | 8760 | 9144 | 9528 | 9912 |
| 17 | 7480 | 7992 | 8248 | 8760 | 9144 | 9528 | 9912 | 10296 | 10296 | 10680 |
| 18 | 8248 | 8760 | 9144 | 9528 | 9912 | 10296 | 10680 | 11064 | 11448 | 11832 |
| 19 | 9144 | 9528 | 9912 | 10296 | 10680 | 11064 | 11448 | 12216 | 12576 | 12960 |
| 20 | 9912 | 10296 | 10680 | 11064 | 11448 | 12216 | 12576 | 12960 | 13536 | 14112 |
| 21 | 10680 | 11064 | 11448 | 12216 | 12576 | 12960 | 13536 | 14112 | 14688 | 15264 |
| 22 | 11448 | 11832 | 12576 | 12960 | 13536 | 14112 | 14688 | 15264 | 15840 | 16416 |
| 23 | 12216 | 12576 | 12960 | 13536 | 14112 | 14688 | 15264 | 15840 | 16416 | 16992 |
| 24 | 12960 | 13536 | 14112 | 14688 | 15264 | 15840 | 16416 | 16992 | 17568 | 18336 |
| 25 | 13536 | 14112 | 14688 | 15264 | 15840 | 16416 | 16992 | 17568 | 18336 | 19080 |
| 26 | 15264 | 16416 | 16992 | 17568 | 18336 | 19080 | 19848 | 20616 | 21384 | 22152 |
| 26A | 13536 | 14112 | 15264 | 15840 | 16416 | 16992 | 17568 | 18336 | 19080 | 19848 |

In another example of Table 4, the eNB or gNB can determine the MCS index, the number of PRBs for allocation, and correspondingly the TBS value. When the UE decodes the DCI, the UE can know which MCS index is used by the eNB and how the resource is allocated. Based on these, the UE can know how much the TBS is by reading Table 4.

In one embodiment of Table 4, the max DL TBS, 'M', is maintained the same as in the 3GPP Rel-13 eMTC standard or in the 3GPP Rel-14 feMTC standard. For instance, for UEs supporting a maximum 1.4 Megahertz (MHz) PDSCH channel bandwidth (BW), the max TBS value M can be 1000 bits. If the UE receives an $I_{TBS}$ value of 12, with an $N_{PRB}$ value of 6 for the 1.4 MHz, the value in Table 4 is 1192. In this example, the UE can proceed with an M value of 1000, the maximum value for the UE. In another instance, for a UE supporting a maximum 5 MHz PDSCH channel BW, the maximum TBS value of M can be set at 4008 bits. When an $I_{TBS}$ value of 8 is received for an $N_{PRB}$ value of 25, the value in Table 4 is 3496. This is less than 4008, so the value of 3496 can be used. When an $I_{TBS}$ value of 12 is received for an $N_{PRB}$ value of 25, the value in Table 4 is 4392. This is greater than 4008, so the value of 4008 can be used.

In another embodiment, the maximum DL TBS, 'M', value can be increased beyond the limits in the 3GPP Rel-13 and 3GPP Rel-14 standards.

These examples are not intended to be limiting. Additional predetermined values may also be used depending on a design used by the system, UE, or gNB. The actual value can vary and depend on the design of the system, UE or gNB.

Downlink Control Information (DCI) Design

In one example of a DCI design, the DCI size can be kept the same as the 3GPP Rel-13 eMTC and 3GPP Rel-14 feMTC standards. As one example of this alternative, the MPDCCH repetition field, the PDSCH repetition field, or the frequency hopping (FH) field can be jointly coded with the existing 4-bit MCS field to provide an indication of a 5-bit MCS value without the need to add an additional bit.

In one embodiment, 64 QAM may only be supported when there is no repetition for MPDCCH and PDSCH. When the 64 QAM is enabled by higher layer signaling, and when the PDSCH repetition level (RL) is indicated to be 1, the MPDCCH repetition field can be used together with MCS field to indicate 64 QAM. For example, the least significant bit (LSB) of the MPDCCH repetition number field, and 4 bits in the existing MCS field can be jointly coded for an indication of a 5-bit MCS. The most significant bit (MSB) of MPDCCH, in this example, can be used as a verification bit, which value is expected to be 0.

Alternatively, in another embodiment, if 64QAM is supported when the higher layer is configured to support 64QAM, and there is no repetition for MPDCCH, then the PDSCH repetition field can be used together with the existing MCS field to indicate 64 QAM, when the MPDCCH repetition level (RL) is indicated to be 1. For example, the least significant bit (LSB) of the PDSCH repetition number field and 4 bits in the existing MCS field can be jointly coded to provide an indication of a 5-bit MCS. Other bits in the PDSCH repetition number field can be set to '0's and used as validation bits.

In one embodiment where 64QAM is supported when the higher layer configures the support of 64QAM and there is no repetition for PDSCH, the 1-bit FH flag can be jointly coded with the existing 4-bit MCS field to provide an indication of a 5-bit MCS when the indicated PDSCH repetition number is 1.

In another embodiment, the order of the DCI fields can be rearranged when 64 QAM is enabled either by explicit radio resource control (RRC) dedicated signaling for the UE, or by the support of 64QAM indicated in the system information block (SIB), and the Rmax value is no more than a certain value (e.g. 8). For example, the repetition number field indicating the PDSCH repetitions can be reordered to be the field following the 1-bit flag to differentiate the DCI format 6-1A/6-0A. If the PDSCH repetition number is indicated to be 1, the frequency hopping (FH) field can be jointly coded with existing 4-bit MCS to provide an indication of a 5-bit MCS. In this example, the can read the DCI once as it detects the repetition number of PDSCH first and knows whether the following 1-bit FH flag and 4-bit MCS field should be jointly interpreted as a 5-bit MCS or not.

In another example, the 4-bit MCS can be used by removing certain rows in the existing MCS and adding the same number of rows for 64 QAM.

In one embodiment, when the 64 QAM is enabled by higher layer signaling, if the MPDCCH and/or the PDSCH repetition number is indicated to be 1, then the 4-bit MCS can be interpreted.

In another embodiment, in the alternative, when the 64 QAM is enabled by higher layer signaling, the 4-bit MCS can always be interpreted based on a new table with 64 QAM, representative of the previously described Table 2, 3A or 3B.

In another embodiment, instead of an explicit configuration of possible 64QAM usage sent via dedicated RRC signaling, the eNB may broadcast using 1 bit via SIB signaling whether it supports 64QAM for PDSCH for BL/CE UEs. Subsequently, the UE can monitor the DCI format 6-1A according to the new interpretation of the fields expecting a possible configuration of 64QAM as the MCS choice, if the Rmax of the UE search space is less than or equal to a predefined integer N, e.g. N=8.

In another example, 1 bit can be added to indicate whether 64 QAM is used or not. In embodiments where 64 QAM is supported only for no repetitions or small repetitions of MPDCCH or PDSCH, the repetition fields (either for PDSCH or MPDCCH) can be used together with the existing MCS field for MCS indication if more than 4 bits are needed for the MCS indication. As another embodiment, additional bits can be added to the MCS field if needed for MCS indication.

Channel Quality Indicator (CQI) Table Design

FIG. 1 illustrates a 4-bit channel quality indicator (CQI) table for 3GPP release 13 (Rel-13) enhanced machine type communications (eMTC). FIG. 1 presents the CQI table for 3GPP Rel-13 eMTC. As no 64 QAM is supported in the 3GPP Rel-13 eMTC, the table in FIG. 1 does not support the feedback from UEs for a higher modulation and code rate.

FIG. 2 illustrates a 4-bit channel quality indicator (CQI) table for cases within 64 Quadrature Amplitude Modulation (QAM). In one example, in cases where 64 QAM is supported for PDSCH, the table can be extended by adding the rows with 64 QAM, or changing the rows marked as reserved in the 3GPP Rel-13 eMTC table. FIG. 2 shows an example on how to extend the existing CQI table to support 64 QAM.

FIG. 3 illustrates a 4-bit channel quality indicator (CQI) table for legacy long term evolution (LTE), such as 3GPP Rel. 8-14. In one embodiment, the existing CQI table in LTE can be used when 64 QAM is enabled, as illustrated in the table in FIG. 2. In one example, the columns of "code rate×1024" and "efficiency" in an existing 3GPP LTE table can be extended to "code rate×1024×$R^{CSI}$" and "efficiency× $R^{CSI}$", respectively. Alternatively, these two columns can be the same as the legacy 3GPP LTE values.

FIG. 4 depicts functionality 400 of a user equipment (UE), configured for coverage enhanced (CE) machine type communication (MTC). The UE can comprise one or more processors configured to encode, at the UE, a UE capability message for transmission to a next generation node B (gNB) or an evolved Node B (eNB), wherein the UE capability message includes a capability to support communication using a modulation and coding scheme (MCS) that includes 64 quadrature amplitude modulation (QAM) 410l The UE can comprise one or more processors configured to decode, at the UE, a higher layer signaling message to configure the UE to operate in a CE mode A and to enable the use of 64QAM for PDSCH 420. The UE can comprise one or more processors configured to decode, at the UE, data received in a physical downlink shared channel (PDSCH) transmission to the UE that is modulated using a 64 QAM 430.

In one embodiment, the apparatus can further comprise a transceiver configured to receive the PDSCH transmission via a unicast transmission from the gNB or the eNB.

In one embodiment, the one or more processors are further configured to decode, at the UE, downlink control information (DCI) in a MTC physical downlink control channel (MPDCCH), wherein the DCI includes a PDSCH repetition number field that indicates a repetition number of 1 for the PDSCH, when the data for the PDSCH is modulated using the 64 QAM.

In one embodiment, the one or more processors are further configured to decode, at the UE, downlink control information (DCI) in a MTC physical downlink control channel (MPDCCH), wherein the DCI includes a MPDCCH repetition number field that indicates a repetition number of 1 for the MPDCCH, when the data for the PDSCH is modulated using the 64 QAM.

In one embodiment, the one or more processors are further configured to decode, at the UE, downlink control information (DCI) in a MTC physical downlink control channel (MPDCCH), wherein the DCI includes a MPDCCH with a maximum number of repetitions configured in a UE-specific search space, wherein the maximum number of repetitions is less than or equal to a predefined integer, when the data for the PDSCH is modulated using the 64 QAM.

In one embodiment, the one or more processors are further configured to encode a channel quality index (CQI) level based on a CQI table, wherein the CQI table comprises:

| CQI index | modulation | code rate × 1024 × $R^{CSI}$ | efficiency × $R^{CSI}$ |
|---|---|---|---|
| 0 | | out of range | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

In one embodiment, the one or more processors are further configured to decode a 5-bit modulation and coding scheme (MCS) field in downlink control information (DCI) format 6-1A received in a MTC physical downlink control channel (MPDCCH), wherein the 5-bit MCS field includes a 4-bit MCS field plus a frequency hopping flag that is interpreted as a most significant bit of the 5-bit MCS field to enable a size of the DCI format 6-1A to remain unchanged.

In one embodiment, the one or more processors are further configured to decode the 5 bit MCS field to select an MCS index using the table:

| MCS Index $I_{MCS}$ | Modulation Order $Q_m$ | Modulation Order $Q'_m$ | TBS Index $I_{TBS}$ |
|---|---|---|---|
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 4 | 5 |
| 6 | 2 | 4 | 6 |
| 7 | 2 | 4 | 7 |
| 8 | 2 | 4 | 8 |
| 9 | 2 | 4 | 9 |
| 10 | 4 | 6 | 9 |
| 11 | 4 | 6 | 10 |
| 12 | 4 | 6 | 11 |
| 13 | 4 | 6 | 12 |
| 14 | 4 | 6 | 13 |
| 15 | 4 | 6 | 14 |
| 16 | 4 | 6 | 15 |
| 17 | 6 | 6 | 15 |
| 18 | 6 | 6 | 16 |
| 19 | 6 | 6 | 17 |
| 20 | 6 | 6 | 18 |
| 21 | 6 | 6 | 19 |
| 22 | 6 | 6 | 20 |
| 23 | 6 | 6 | 21 |
| 24 | 6 | 6 | 22 |
| 25 | 6 | 6 | 23 |
| 26 | 6 | 6 | 24 |
| 27 | 6 | 6 | 25 |
| 28 | 6 | 6 | 26/26A |
| 29 | 2 | 2 | reserved |
| 30 | 4 | 4 | |
| 31 | 6 | 6 | |

In one embodiment, the one or more processors are further configured to select a transport block size value based on a modulation and coding scheme (MCS) index value and a transport block size (TBS) index value using table 7.1.7.2.1-1 of third generation partnership project (3gpp) technical specification (TS) 36.213 Release 14.0.0.

In one embodiment, the one or more processors are further configured to select a maximum TBS value that is supported by the UE when the TBS value determined by the TBS index and PRB allocation from the table 7.1.7.2.1-1 is greater than the maximum TBS value.

In one embodiment, the maximum TBS value is equal to a maximum downlink TBS value of third generation partnership project (3gpp) release 14 further enhanced machine type communications (feMTC).

In one embodiment, the one or more processors are further configured to decode a higher layer signaling message to semi-statically configure the UE to decode the PDSCH transmission that is modulated using the 64 QAM.

Figure 5:
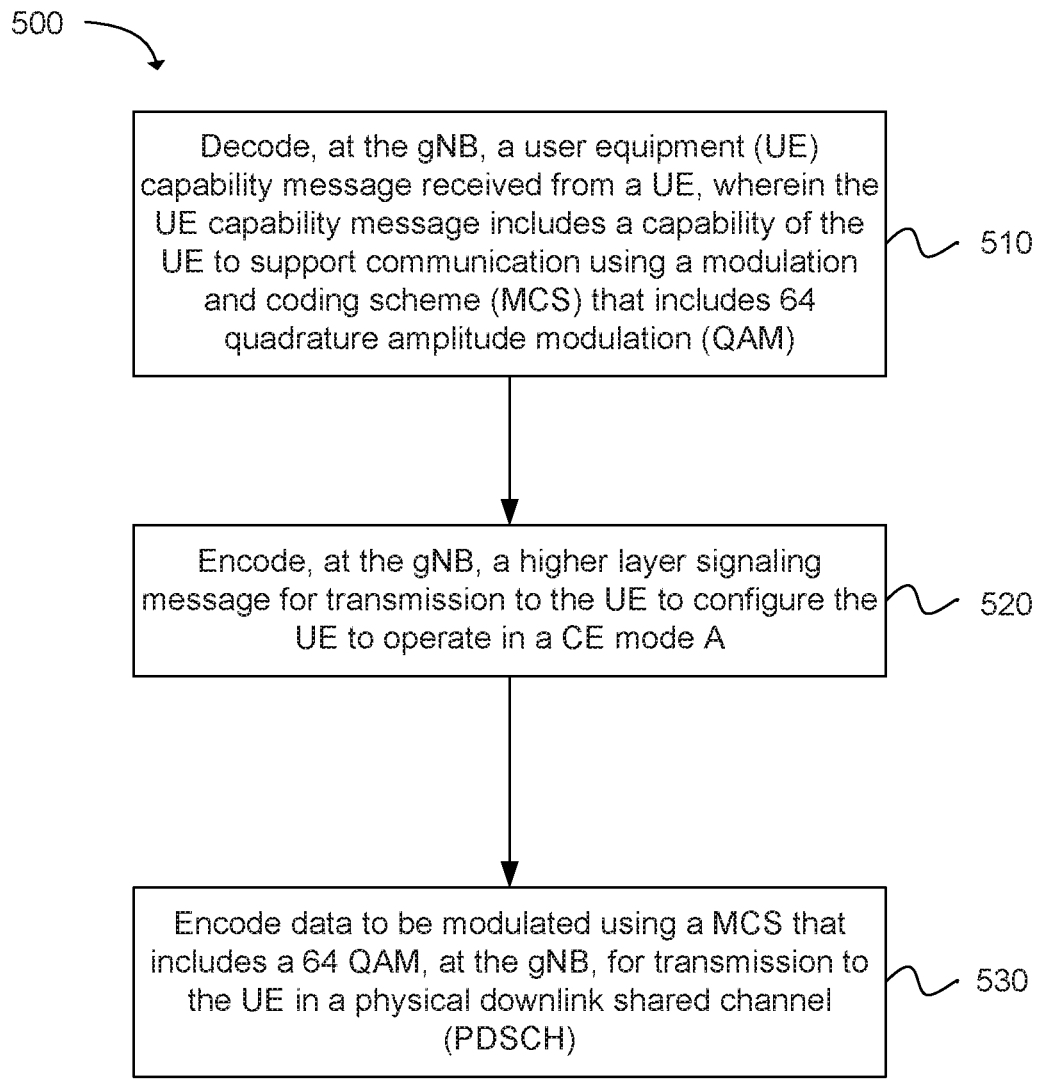
FIG. 5 depicts functionality of a next generation node B (gNB), configured for coverage enhanced (CE) machine type communication (MTC), in accordance with an example.

FIG. 5 depicts functionality 500 of a next generation node B (gNB), configured for coverage enhanced (CE) machine type communication (MTC). The gNB can comprise one or more processors configured to decode, at the gNB, a user equipment (UE) capability message received from a UE, wherein the UE capability message includes a capability of the UE to support communication using a modulation and coding scheme (MCS) that includes 64 quadrature amplitude modulation (QAM) 510. The gNB can comprise one or more processors configured to encode, at the gNB, a higher layer signaling message for transmission to the UE to configure the UE to operate in a CE mode A and to enable the use of 64QAM for PDSCH 520. The gNB can comprise one or more processors configured to encode data to be modulated using a MCS that includes a 64 QAM, at the gNB, for transmission to the UE in a physical downlink shared channel (PDSCH) 530.

In one embodiment, the gNB can further comprise a transceiver configured to transmit the PDSCH transmission via a unicast transmission from the gNB.

In one embodiment, the one or more processors are further configured to encode, at the gNB, downlink control information (DCI) in a MTC physical downlink control channel (MPDCCH), wherein the DCI includes a PDSCH repetition number field that indicates a repetition number of 1 for the PDSCH, when the data for the PDSCH is modulated using the 64 QAM.

In one embodiment, the one or more processors are further configured to encode, at the gNB, downlink control information (DCI) in a MTC physical downlink control channel (MPDCCH), wherein the DCI includes a MPDCCH repetition number field that indicates a repetition number of 1 for the MPDCCH, when the data for the PDSCH is modulated using the 64 QAM.

In one embodiment, the one or more processors are further configured to encode, at the gNB, downlink control information (DCI) in a MTC physical downlink control channel (MPDCCH), wherein the DCI includes a MPDCCH with a maximum number of repetitions configured in a UE-specific search space, wherein the maximum number of repetitions is less than or equal to a predefined integer, when the data for the PDSCH is modulated using the 64 QAM.

In one embodiment, the one or more processors are further configured to decode a channel quality index (CQI) received from the UE, wherein the CQI table comprises:

| CQI index | modulation | code rate × 1024 × $R^{CSI}$ | efficiency × $R^{CSI}$ |
|---|---|---|---|
| 0 | | out of range | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

In one embodiment, the one or more processors are further configured to encode a 5-bit modulation and coding scheme (MCS) field in downlink control information (DCI) format 6-1A for transmission in a MTC physical downlink control channel (MPDCCH), wherein the 5-bit MCS field includes a 4-bit MCS field plus a frequency hopping flag that is interpreted as a most significant bit of the 5-bit MCS field to enable a size of the DCI format 6-1A to remain unchanged.

In one embodiment, the one or more processors are further configured to use the 5 bit MCS field to select an MCS index using the table:

| MCS Index $I_{MCS}$ | Modulation Order $Q_m$ | Modulation Order $Q'_m$ | TBS Index $I_{TBS}$ |
|---|---|---|---|
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 4 | 5 |
| 6 | 2 | 4 | 6 |
| 7 | 2 | 4 | 7 |
| 8 | 2 | 4 | 8 |
| 9 | 2 | 4 | 9 |
| 10 | 4 | 6 | 9 |
| 11 | 4 | 6 | 10 |
| 12 | 4 | 6 | 11 |
| 13 | 4 | 6 | 12 |
| 14 | 4 | 6 | 13 |
| 15 | 4 | 6 | 14 |
| 16 | 4 | 6 | 15 |
| 17 | 6 | 6 | 15 |
| 18 | 6 | 6 | 16 |
| 19 | 6 | 6 | 17 |
| 20 | 6 | 6 | 18 |
| 21 | 6 | 6 | 19 |
| 22 | 6 | 6 | 20 |
| 23 | 6 | 6 | 21 |
| 24 | 6 | 6 | 22 |
| 25 | 6 | 6 | 23 |
| 26 | 6 | 6 | 24 |
| 27 | 6 | 6 | 25 |
| 28 | 6 | 6 | 26/26A |
| 29 | 2 | 2 | reserved |
| 30 | 4 | 4 | |
| 31 | 6 | 6 | |

In one embodiment, the one or more processors are further configured to encode a transport block size (TBS) index value and a number of physical resource blocks ($N_{PRB}$) to enable the UE to select a TBS value using table 7.1.7.2.1-1 of third generation partnership project (3gpp) technical specification (TS) 36.213 Release 14.0.0.

In one embodiment, the one or more processors are further configured to select a maximum TBS value that is supported by the UE when the TBS value determined by the TBS index and PRB allocation from the table 7.1.7.2.1-1 is greater than the maximum TBS value.

Figure 6:
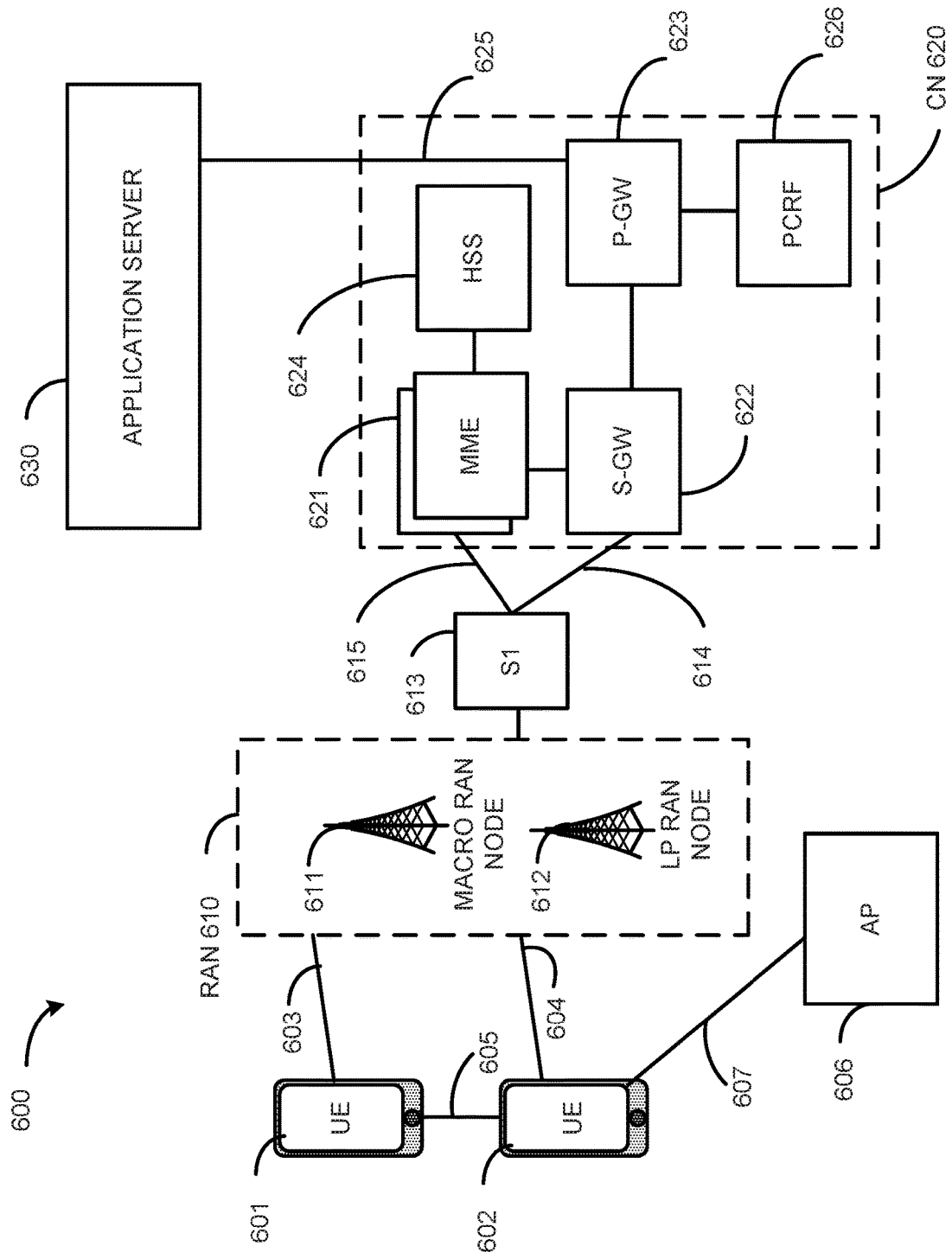
FIG. 6 illustrates an architecture of a network in accordance with an example.

FIG. 6 illustrates architecture of a system 600 of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a Ne8Gen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi®) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), ne8 Generation NodeBs (gNB), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an e8ension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 interface 613. In embodiments, the CN 620 may be an evolved packet core (EPC) network, a Ne8Gen Packet Core (NPC) network, or some other type of CN. In this embodiment the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and e8ernal networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Enforcement Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

Figure 7:
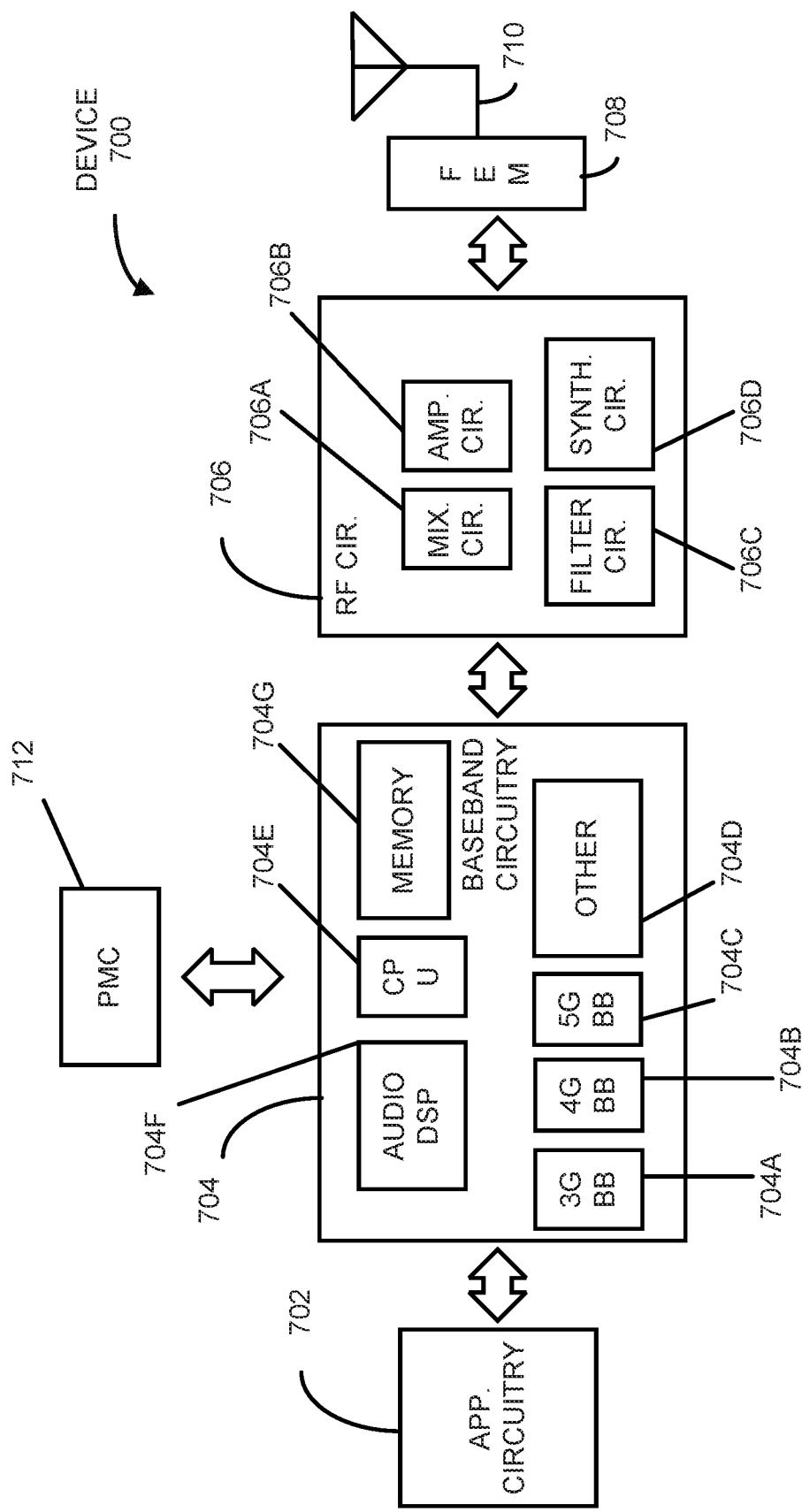
FIG. 7 illustrates a diagram of a wireless device (e.g., UE) and a base station (e.g., eNodeB) in accordance with an example.

FIG. 7 illustrates example components of a device 700 in accordance with some embodiments. In some embodiments, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE or a RAN node. In some embodiments, the device 700 may include less elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuity 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a necessity. In some embodiments, mixer circuitry 706*a* of the receive signal path may comprise passive mixers, although the scope of the embodiments is not limited in this respect.

In some embodiments, the mixer circuitry 706*a* of the transmit signal path may be configured to up-convert input baseband signals based on the synthesized frequency provided by the synthesizer circuitry 706*d* to generate RF output signals for the FEM circuitry 708. The baseband signals may be provided by the baseband circuitry 704 and may be filtered by filter circuitry 706*c*.

In some embodiments, the mixer circuitry 706*a* of the receive signal path and the mixer circuitry 706*a* of the transmit signal path may include two or more mixers and may be arranged for quadrature downconversion and upconversion, respectively. In some embodiments, the mixer circuitry 706*a* of the receive signal path and the mixer circuitry 706*a* of the transmit signal path may include two or more mixers and may be arranged for image rejection (e.g., Hartley image rejection). In some embodiments, the mixer circuitry 706*a* of the receive signal path and the mixer circuitry 706*a* may be arranged for direct downconversion and direct upconversion, respectively. In some embodiments, the mixer circuitry 706*a* of the receive signal path and the mixer circuitry 706*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706*d* may be a fractional-N synthesizer or a fractional N/N+1 synthesizer, although the scope of the embodiments is not limited in this respect as other types of frequency synthesizers may be suitable. For example, synthesizer circuitry 706*d* may be a delta-sigma synthesizer, a frequency multiplier, or a synthesizer comprising a phase-locked loop with a frequency divider.

The synthesizer circuitry 706*d* may be configured to synthesize an output frequency for use by the mixer circuitry 706*a* of the RF circuitry 706 based on a frequency input and a divider control input. In some embodiments, the synthesizer circuitry 706*d* may be a fractional N/N+1 synthesizer.

In some embodiments, frequency input may be provided by a voltage controlled oscillator (VCO), although that is not a necessity. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706*d* of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM 708, or in both the RF circuitry 706 and the FEM 708.

In some embodiments, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device is included in a UE. The PMC 712 may increase the power conversion efficiency while providing desirable implementation size and heat dissipation characteristics.

While FIG. 7 shows the PMC 712 coupled only with the baseband circuitry 704. However, in other embodiments, the PMC 712 may be additionally or alternatively coupled with, and perform similar power management operations for, other components such as, but not limited to, application circuitry 802, RF circuitry 706, or FEM 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX)

after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used execute Layer 3, Layer 2, or Layer 1 functionality, while processors of the application circuitry 704 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
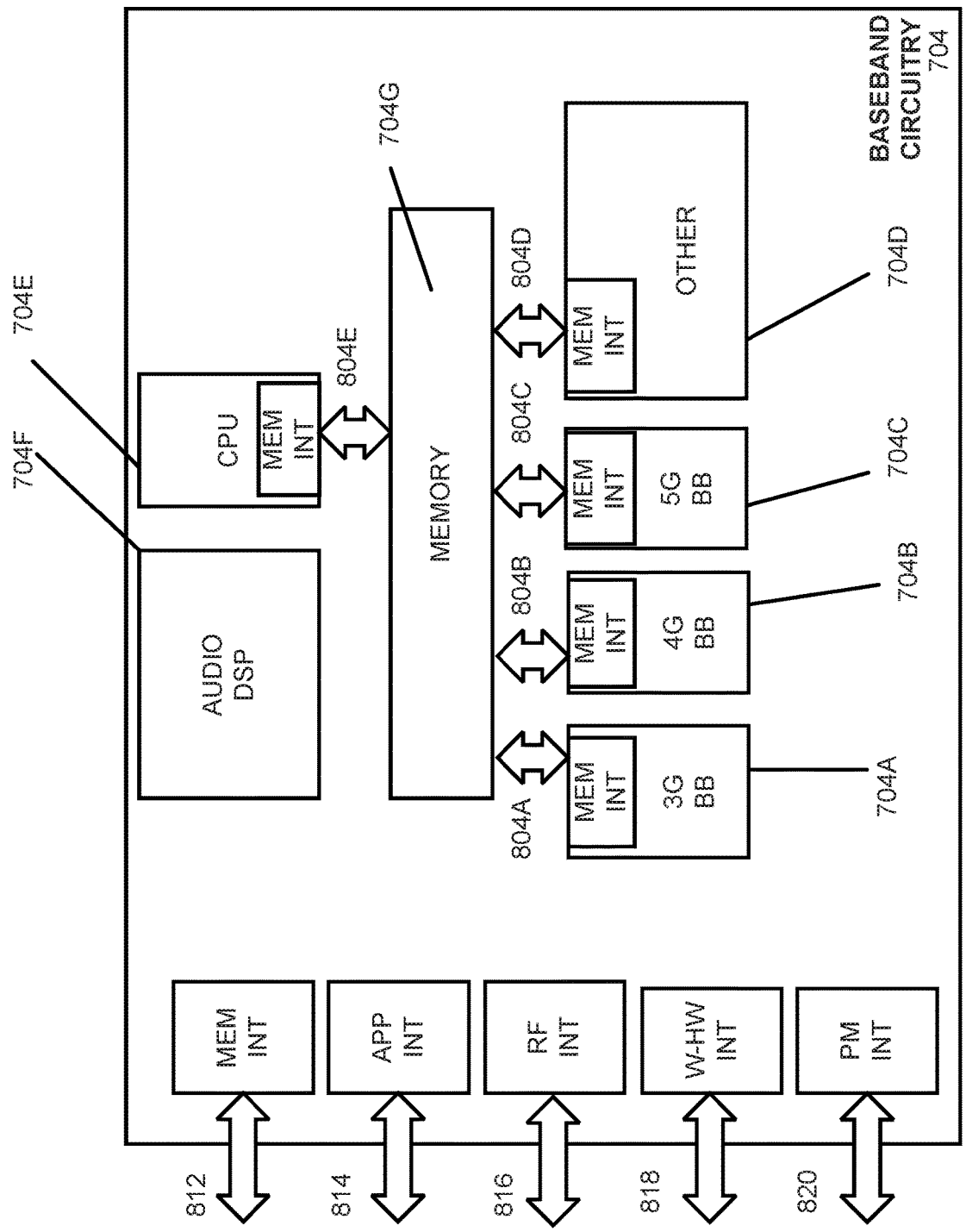
FIG. 8 illustrates example interfaces of baseband circuitry in accordance with an example.

FIG. 8 illustrates example interfaces of baseband circuitry in accordance with some embodiments. As discussed above, the baseband circuitry 704 of FIG. 7 may comprise processors 704A-704E and a memory 704G utilized by said processors. Each of the processors 704A-704E may include a memory interface, 804A-804E, respectively, to send/receive data to/from the memory 704G

The baseband circuitry 704 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712.

Figure 9:
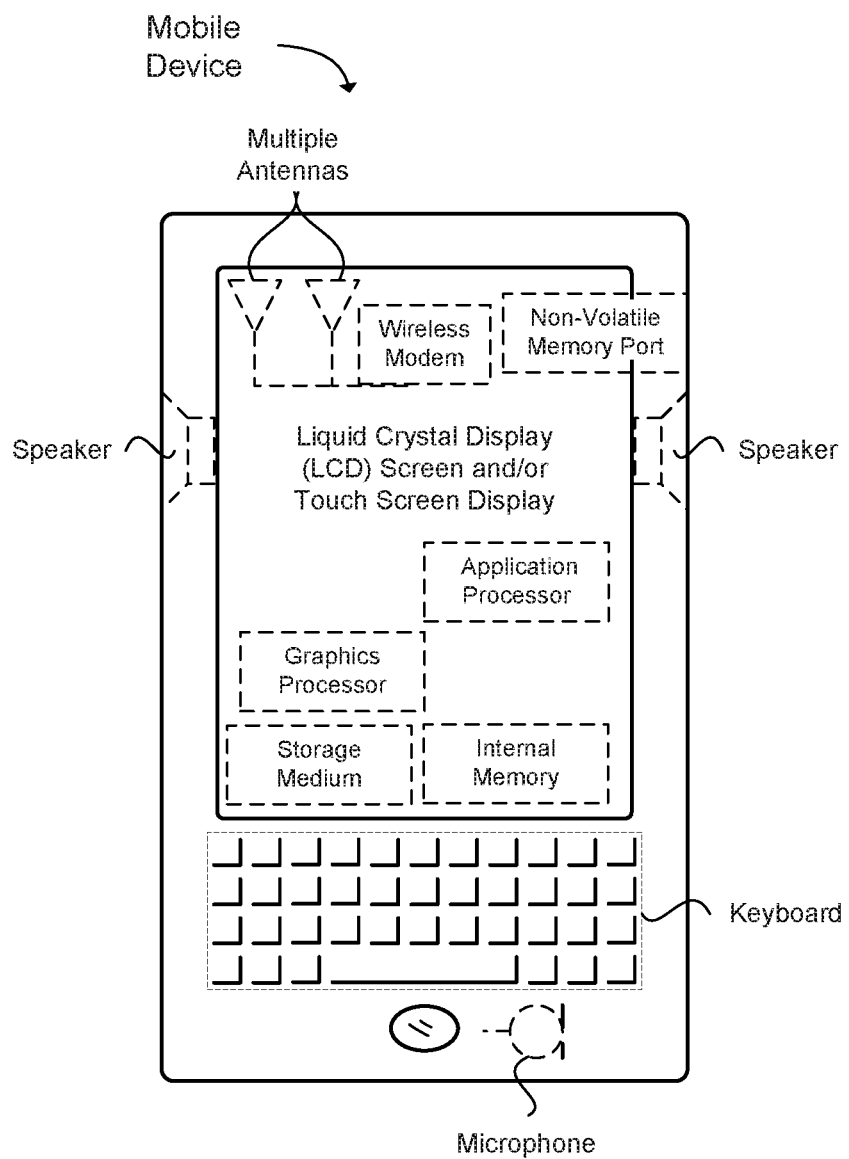
FIG. 9 illustrates a diagram of a wireless device (e.g., UE) in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 9 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE), configured for coverage enhanced (CE) machine type communication (MTC), the apparatus comprising: one or more processors configured to: encode, at the UE, a UE capability message for transmission to a next generation node B (gNB) or evolved Node B (eNB), wherein the UE capability message includes a capability to support communication using a modulation and coding scheme (MCS) that includes 64 quadrature amplitude modulation (QAM); decode, at the UE, a higher layer signaling message to configure the UE to operate in a CE mode A; and decode, at the UE, data received in a physical downlink shared channel (PDSCH) transmission to the UE that is modulated using a 64 QAM; and a memory interface configured to receive from a memory the UE capability message.

Example 2 includes the apparatus of example 1, further comprising a transceiver configured to receive the PDSCH transmission via a unicast transmission from the gNB or the eNB.

Example 3 includes the apparatus of example 1 or 2, wherein the one or more processors are further configured to decode, at the UE, downlink control information (DCI) in a MTC physical downlink control channel (MPDCCH), wherein the DCI includes a PDSCH repetition number field that indicates a repetition number of 1 for the PDSCH, when the data for the PDSCH is modulated using the 64 QAM.

Example 4 includes the apparatus of example 1 or 2, wherein the one or more processors are further configured to decode, at the UE, downlink control information (DCI) in a MTC physical downlink control channel (MPDCCH), wherein the DCI includes a MPDCCH repetition number field that indicates a repetition number of 1 for the MPDCCH, when the data for the PDSCH is modulated using the 64 QAM.

Example 5 includes the apparatus of example 1 or 2, wherein the one or more processors are further configured to decode, at the UE, downlink control information (DCI) in a MTC physical downlink control channel (MPDCCH), wherein the DCI includes a MPDCCH with a maximum number of repetitions configured in a UE-specific search space, wherein the maximum number of repetitions is less than or equal to a predefined integer, when the data for the PDSCH is modulated using the 64 QAM.

Example 6 includes the apparatus of example 1, wherein the one or more processors are further configured to encode a channel quality index (CQI) level based on a CQI table, wherein the CQI table comprises:

| CQI index | modulation | code rate × 1024 × $R^{CSI}$ | efficiency × $R^{CSI}$ |
|---|---|---|---|
| 0 | | out of range | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

Example 7 includes the apparatus of example 1, wherein the one or more processors are further configured to decode a 5-bit modulation and coding scheme (MCS) field in downlink control information (DCI) format 6-1A received in a MTC physical downlink control channel (MPDCCH), wherein the 5-bit MCS field includes a 4-bit MCS field plus a frequency hopping flag that is interpreted as a most significant bit of the 5-bit MCS field, when the number of repetitions indicated for PDSCH is 1, to enable a size of the DCI format 6-1A to remain unchanged.

Example 8 includes the apparatus of example 7, wherein the one or more processors are further configured to decode the 5 bit MCS field to select an MCS index based at least on information in a table comprising:

| MCS Index $I_{MCS}$ | Modulation Order $Q_m$ | Modulation Order $Q_m$ | TBS Index $I_{TBS}$ |
|---|---|---|---|
| 0 | 2 | 2 | 0 |
| 1 | 2 | 2 | 1 |
| 2 | 2 | 2 | 2 |

-continued

| MCS Index $I_{MCS}$ | Modulation Order $Q_m$ | Modulation Order $Q_m$ | TBS Index $I_{TBS}$ |
|---|---|---|---|
| 3 | 2 | 2 | 3 |
| 4 | 2 | 2 | 4 |
| 5 | 2 | 4 | 5 |
| 6 | 2 | 4 | 6 |
| 7 | 2 | 4 | 7 |
| 8 | 2 | 4 | 8 |
| 9 | 2 | 4 | 9 |
| 10 | 4 | 6 | 9 |
| 11 | 4 | 6 | 10 |
| 12 | 4 | 6 | 11 |
| 13 | 4 | 6 | 12 |
| 14 | 4 | 6 | 13 |
| 15 | 4 | 6 | 14 |
| 16 | 4 | 6 | 15 |
| 17 | 6 | 6 | 15 |
| 18 | 6 | 6 | 16 |
| 19 | 6 | 6 | 17 |
| 20 | 6 | 6 | 18 |
| 21 | 6 | 6 | 19 |
| 22 | 6 | 6 | 20 |
| 23 | 6 | 6 | 21 |
| 24 | 6 | 6 | 22 |
| 25 | 6 | 6 | 23 |
| 26 | 6 | 6 | 24 |
| 27 | 6 | 6 | 25 |
| 28 | 6 | 6 | 26/26A |
| 29 | 2 | 2 | reserved |
| 30 | 4 | 4 | |
| 31 | 6 | 6 | |

Example 9 includes the apparatus of example 1 or 2, wherein the one or more processors are further configured to select a transport block size (TBS) value based on a modulation and coding scheme (MCS) index value and a transport block size (TBS) index value.

Example 10 includes the apparatus of example 9, wherein the one or more processors are further configured to select a maximum TBS value that is supported by the UE when the TBS value determined by the TBS index and PRB allocation is greater than the maximum TBS value.

Example 11 includes the apparatus of example 10, wherein the maximum TBS value is equal to a maximum downlink TBS value of third generation partnership project (3gpp) release 14 further enhanced machine type communications (feMTC).

Example 12 includes the apparatus of example 1 to 5, further comprising a transceiver configured to decode a higher layer signaling message to semi-statically configure the UE to decode the PDSCH transmission that is modulated using the 64 QAM.

Example 13 includes an apparatus of a next generation node B (gNB), configured for coverage enhanced (CE) machine type communication (MTC), the apparatus comprising: one or more processors configured to: decode, at the gNB, a user equipment (UE) capability message received from a UE, wherein the UE capability message includes a capability of the UE to support communication using a modulation and coding scheme (MCS) that includes 64 quadrature amplitude modulation (QAM); encode, at the gNB, a higher layer signaling message for transmission to the UE to configure the UE to operate in a CE mode A; and encode data to be modulated using a MCS that includes a 64 QAM, at the gNB, for transmission to the UE in a physical downlink shared channel (PDSCH); and a memory interface configured to send to a memory the UE capability message.

Example 14 includes the apparatus of example 12, further comprising a transceiver configured to transmit the PDSCH transmission via a unicast transmission from the gNB.

Example 15 includes the apparatus of example 12 or 14, wherein the one or more processors are further configured to encode, at the gNB, downlink control information (DCI) in a MTC physical downlink control channel (MPDCCH), wherein the DCI includes a PDSCH repetition number field that indicates a repetition number of 1 for the PDSCH, when the data for the PDSCH is modulated using the 64 QAM.

Example 16 includes the apparatus of example 12 to 15, wherein the one or more processors are further configured to encode, at the gNB, downlink control information (DCI) in a MTC physical downlink control channel (MPDCCH), wherein the DCI includes a MPDCCH repetition number field that indicates a repetition number of 1 for the MPDCCH, when the data for the PDSCH is modulated using the 64 QAM.

Example 17 includes the apparatus of example 12 or 14, wherein the one or more processors are further configured to encode, at the gNB, downlink control information (DCI) in a MTC physical downlink control channel (MPDCCH), wherein the DCI includes a MPDCCH with a maximum number of repetitions configured in a UE-specific search space, wherein the maximum number of repetitions is less than or equal to a predefined integer, when the data for the PDSCH is modulated using the 64 QAM.

Example 18 includes the apparatus of example 12, wherein the one or more processors are further configured to decode a channel quality index (CQI) received from the UE based on a CQI table, wherein the CQI table comprises:

| CQI index | modulation | code rate × 1024 × $R^{CSI}$ | efficiency × $R^{CSI}$ |
| --- | --- | --- | --- |
| 0 | | out of range | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

Example 19 includes the apparatus of example 12, wherein the one or more processors are further configured to encode a 5-bit modulation and coding scheme (MCS) field in downlink control information (DCI) format 6-1A for transmission in a MTC physical downlink control channel (MPDCCH), wherein the 5-bit MCS field includes a 4-bit MCS field plus a frequency hopping flag that is interpreted as a most significant bit of the 5-bit MCS field, when the number of repetitions indicated for PDSCH is 1, to enable a size of the DCI format 6-1A to remain unchanged.

Example 20 includes the apparatus of example 18, wherein the one or more processors are further configured to use the 5 bit MCS field to select an MCS index based at least on information in a table comprising:

| MCS Index $I_{MCS}$ | Modulation Order $Q_m$ | Modulation Order $Q_m$ | TBS Index $I_{TBS}$ |
| --- | --- | --- | --- |
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 4 | 5 |
| 6 | 2 | 4 | 6 |
| 7 | 2 | 4 | 7 |
| 8 | 2 | 4 | 8 |
| 9 | 2 | 4 | 9 |
| 10 | 4 | 6 | 9 |
| 11 | 4 | 6 | 10 |
| 12 | 4 | 6 | 11 |
| 13 | 4 | 6 | 12 |
| 14 | 4 | 6 | 13 |
| 15 | 4 | 6 | 14 |
| 16 | 4 | 6 | 15 |
| 17 | 6 | 6 | 15 |
| 18 | 6 | 6 | 16 |
| 19 | 6 | 6 | 17 |
| 20 | 6 | 6 | 18 |
| 21 | 6 | 6 | 19 |
| 22 | 6 | 6 | 20 |
| 23 | 6 | 6 | 21 |
| 24 | 6 | 6 | 22 |
| 25 | 6 | 6 | 23 |
| 26 | 6 | 6 | 24 |
| 27 | 6 | 6 | 25 |
| 28 | 6 | 6 | 26/26A |
| 29 | 2 | 2 | reserved |
| 30 | 4 | 4 | |
| 31 | 6 | 6 | |

Example 21 includes the apparatus of example 12, wherein the one or more processors are further configured to encode a transport block size (TBS) index value and a number of physical resource blocks ($N_{PRB}$) to enable the UE to select a TBS value from a predetermined table.

Example 22 includes the apparatus of example 20, wherein the one or more processors are further configured to select a maximum TBS value that is supported by the UE when the TBS value determined by the TBS index and PRB allocation, from the predetermined table, is greater than the maximum TBS value.

Example 23 includes at least one machine readable storage medium having instructions embodied thereon for a next generation node B (gNB), configured for coverage enhanced (CE) machine type communication (MTC), the instructions thereon when executed by one or more processors at the UE perform the following: decode, at the gNB, a user equipment (UE) capability message received from a UE, wherein the UE capability message includes a capability of the UE to support communication using a modulation and coding scheme (MCS) that includes 64 quadrature amplitude modulation (QAM); encode, at the gNB, a higher layer signaling message for transmission to the UE to configure the UE to operate in a CE mode A; and encode data to be modulated using a MCS that includes a 64 QAM, at the gNB, for transmission to the UE in a physical downlink shared channel (PDSCH).

Example 24 includes the at least one machine readable storage medium of example 23 further comprising instructions, that when executed by one or more processors at the gNB, perform the following: encode, at the gNB, downlink control information (DCI) in a MTC physical downlink control channel (MPDCCH), wherein the DCI includes a PDSCH repetition number field that indicates a repetition number of 1 for the PDSCH, when the data for the PDSCH is modulated using the 64 QAM.

Example 25 includes the at least one machine readable storage medium of example further comprising instructions, that when executed by one or more processors at the gNB, perform the following: encode, at the gNB, downlink control information (DCI) in a MTC physical downlink control channel (MPDCCH), wherein the DCI includes a MPDCCH repetition number field that indicates a repetition number of 1 for the MPDCCH, when the data for the PDSCH is modulated using the 64 QAM.

Example 26 includes the at least one machine readable storage medium of example further comprising instructions, that when executed by one or more processors at the gNB, perform the following: encode, at the gNB, downlink control information (DCI) in a MTC physical downlink control channel (MPDCCH), wherein the DCI includes a MPDCCH with a maximum number of repetitions configured in a UE-specific search space, wherein the maximum number of repetitions is less than or equal to a predefined integer, when the data for the PDSCH is modulated using the 64 QAM.

Example 27 includes the at least one machine readable storage medium of example further comprising instructions, that when executed by one or more processors at the gNB, perform the following: encode a 5-bit modulation and coding scheme (MCS) field in downlink control information (DCI) format 6-1A for transmission in a MTC physical downlink control channel (MPDCCH), wherein the 5-bit MCS field includes a 4-bit MCS field plus a frequency hopping flag that is interpreted as a most significant bit of the 5-bit MCS field, when the number of repetitions indicated for PDSCH is 1, to enable a size of the DCI format 6-1A to remain unchanged.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A user equipment (UE), configured for coverage enhanced (CE) machine type communication (MTC), the UE comprising:
   one or more processors configured to:
      encode, at the UE, a UE capability message for transmission to a base station, wherein the UE capability message includes a capability to support communication using a modulation and coding scheme (MCS) that includes 64 quadrature amplitude modulation (QAM);
      decode, at the UE, a higher layer signaling message to configure the UE to operate in a CE mode A; and
      decode, at the UE, data received in a physical downlink shared channel (PDSCH) transmission to the UE that is modulated using a 64 QAM; and
   a memory interface configured to receive from a memory the UE capability message.

2. The UE of claim 1, further comprising a transceiver configured to receive the PDSCH transmission via a unicast transmission from the base station.

3. The UE of claim 1, wherein the one or more processors are further configured to decode, at the UE, downlink control information (DCI) in a MTC physical downlink control channel (MPDCCH), wherein the DCI includes a PDSCH repetition number field that indicates a repetition number of 1 for the PDSCH transmission, when the data for the PDSCH transmission is modulated using the 64 QAM.

4. The UE of claim 1, wherein the one or more processors are further configured to decode, at the UE, downlink control information (DCI) in a MTC physical downlink control channel (MPDCCH), wherein the DCI includes a MPDCCH repetition number field that indicates a repetition number of 1 for the MPDCCH, when the data for the PDSCH transmission is modulated using the 64 QAM.

5. The UE of claim 1, wherein the one or more processors are further configured to decode, at the UE, downlink control information (DCI) in a MTC physical downlink control channel (MPDCCH), wherein the DCI includes a MPDCCH with a maximum number of repetitions configured in a UE-specific search space, wherein the maximum number of repetitions is less than or equal to a predefined integer, when the data for the PDSCH transmission is modulated using the 64 QAM.

6. The UE of claim 1, wherein the one or more processors are further configured to encode a channel quality index (CQI) level based on a CQI table, wherein the CQI table comprises:

| CQI index | modulation | code rate × 1024 × $R^{CSI}$ | efficiency × $R^{CSI}$ |
|---|---|---|---|
| 0 | | out of range | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

7. The UE of claim 1, wherein the one or more processors are further configured to decode a 5-bit modulation and coding scheme (MCS) field in a downlink control information (DCI) format 6-1A received in a MTC physical downlink control channel (MPDCCH), wherein the 5-bit MCS field includes a 4-bit MCS field plus a frequency hopping flag that is interpreted as a most significant bit of the 5-bit MCS field, when a number of repetitions indicated for the PDSCH transmission is 1, to enable a size of the DCI format 6-1A to remain unchanged.

8. The UE of claim 7, wherein the one or more processors are further configured to decode the 5-bit MCS field to select an MCS index based at least on information in a table comprising:

| MCS Index $I_{MCS}$ | Modulation Order $Q_m$ | Modulation Order $Q'_m$ | TBS Index $I_{TBS}$ |
|---|---|---|---|
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 4 | 5 |
| 6 | 2 | 4 | 6 |
| 7 | 2 | 4 | 7 |
| 8 | 2 | 4 | 8 |
| 9 | 2 | 4 | 9 |
| 10 | 4 | 6 | 9 |
| 11 | 4 | 6 | 10 |
| 12 | 4 | 6 | 11 |
| 13 | 4 | 6 | 12 |
| 14 | 4 | 6 | 13 |
| 15 | 4 | 6 | 14 |
| 16 | 4 | 6 | 15 |
| 17 | 6 | 6 | 15 |
| 18 | 6 | 6 | 16 |
| 19 | 6 | 6 | 17 |
| 20 | 6 | 6 | 18 |
| 21 | 6 | 6 | 19 |
| 22 | 6 | 6 | 20 |
| 23 | 6 | 6 | 21 |
| 24 | 6 | 6 | 22 |
| 25 | 6 | 6 | 23 |
| 26 | 6 | 6 | 24 |
| 27 | 6 | 6 | 25 |

-continued

| MCS Index $I_{MCS}$ | Modulation Order $Q_m$ | Modulation Order $Q'_m$ | TBS Index $I_{TBS}$ |
|---|---|---|---|
| 28 | 6 | 6 | 26/26A reserved |
| 29 | 2 | 2 | |
| 30 | 4 | 4 | |
| 31 | 6 | 6 | |

9. The UE of claim 1, wherein the one or more processors are further configured to select a transport block size (TBS) value based on a predetermined table that includes a selected modulation and coding scheme (MCS) index value and a selected transport block size (TBS) index value.

10. The UE of claim 9, wherein the one or more processors are further configured to select a maximum TBS value that is supported by the UE when the TBS value determined by the TBS index and PRB allocation, from the predetermined table, is greater than the maximum TBS value.

11. The UE of claim 1, further comprising a transceiver configured to decode the higher layer signaling message or a second higher layer signaling message to semi-statically configure the UE to decode the PDSCH transmission that is modulated using the 64 QAM.

12. A base station configured for coverage enhanced (CE) machine type communication (MTC), the base station comprising:
one or more processors configured to:
decode, at the base station, a user equipment (UE) capability message received from a UE, wherein the UE capability message includes a capability of the UE to support communication using a modulation and coding scheme (MCS) that includes 64 quadrature amplitude modulation (QAM);
encode, at the base station, a higher layer signaling message for transmission to the UE to configure the UE to operate in a CE mode A; and
encode data to be modulated using a MCS that includes a 64 QAM, at the base station, for transmission to the UE in a physical downlink shared channel (PDSCH); and
a memory interface configured to send to a memory the UE capability message.

13. The base station of claim 12, further comprising a transceiver configured to transmit the PDSCH via a unicast transmission from the base station.

14. The base station of claim 12, wherein the one or more processors are further configured to encode, at the base station, downlink control information (DCI) in a MTC physical downlink control channel (MPDCCH), wherein the DCI includes a PDSCH repetition number field that indicates a repetition number of 1 for the PDSCH, when the data for the PDSCH is modulated using the 64 QAM.

15. The base station of claim 12, wherein the one or more processors are further configured to encode, at the base station, downlink control information (DCI) in a MTC physical downlink control channel (MPDCCH), wherein the DCI includes a MPDCCH repetition number field that indicates a repetition number of 1 for the MPDCCH, when the data for the PDSCH is modulated using the 64 QAM.

16. The base station of claim 12, wherein the one or more processors are further configured to encode, at the base station, downlink control information (DCI) in a MTC physical downlink control channel (MPDCCH), wherein the DCI includes a MPDCCH with a maximum number of repetitions configured in a UE-specific search space, wherein the maximum number of repetitions is less than or equal to a predefined integer, when the data for the PDSCH is modulated using the 64 QAM.

17. The base station of claim 12, wherein the one or more processors are further configured to decode a channel quality index (CQI) received from the UE based on a CQI table, wherein the CQI table comprises:

| CQI index | modulation | code rate × 1024 × $R^{CSI}$ | efficiency × $R^{CSI}$ |
|---|---|---|---|
| 0 | out of range | | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

18. The base station of claim 12, wherein the one or more processors are further configured to encode a 5-bit modulation and coding scheme (MCS) field in a downlink control information (DCI) format 6-1A for transmission in a MTC physical downlink control channel (MPDCCH), wherein the 5-bit MCS field includes a 4-bit MCS field plus a frequency hopping flag that is interpreted as a most significant bit of the 5-bit MCS field, when a number of repetitions indicated for the PDSCH is 1, to enable a size of the DCI format 6-1A to remain unchanged.

19. The base station of claim 18, wherein the one or more processors are further configured to use the 5-bit MCS field to select an MCS index based at least on information in a table comprising:

| MCS Index $I_{MCS}$ | Modulation Order $Q_m$ | Modulation Order $Q'_m$ | TBS Index $I_{TBS}$ |
|---|---|---|---|
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 4 | 5 |
| 6 | 2 | 4 | 6 |
| 7 | 2 | 4 | 7 |
| 8 | 2 | 4 | 8 |
| 9 | 2 | 4 | 9 |
| 10 | 4 | 6 | 9 |
| 11 | 4 | 6 | 10 |
| 12 | 4 | 6 | 11 |
| 13 | 4 | 6 | 12 |
| 14 | 4 | 6 | 13 |
| 15 | 4 | 6 | 14 |
| 16 | 4 | 6 | 15 |
| 17 | 6 | 6 | 15 |
| 18 | 6 | 6 | 16 |
| 19 | 6 | 6 | 17 |
| 20 | 6 | 6 | 18 |
| 21 | 6 | 6 | 19 |
| 22 | 6 | 6 | 20 |
| 23 | 6 | 6 | 21 |
| 24 | 6 | 6 | 22 |
| 25 | 6 | 6 | 23 |
| 26 | 6 | 6 | 24 |

-continued

| MCS Index $I_{MCS}$ | Modulation Order $Q_m$ | Modulation Order $Q'_m$ | TBS Index $I_{TBS}$ |
|---|---|---|---|
| 27 | 6 | 6 | 25 |
| 28 | 6 | 6 | 26/26A reserved |
| 29 | 2 | 2 | |
| 30 | 4 | 4 | |
| 31 | 6 | 6 | |

20. The base station of claim 12, wherein the one or more processors are further configured to encode a transport block size (TBS) index value and a number of physical resource blocks ($N_{PRB}$) to enable the UE to select a TBS value from a predetermined table.

21. The base station of claim 20, wherein the one or more processors are further configured to select a maximum TBS value that is supported by the UE when the TBS value determined by the TBS index and PRB allocation, from the predetermined table, is greater than the maximum TBS value.

22. At least one non-transitory machine readable storage medium having instructions embodied thereon for a base station configured for coverage enhanced (CE) machine type communication (MTC), the instructions thereon when executed by one or more processors at the UE of the base station perform the following:
   decode, at the base station, a user equipment (UE) capability message received from a UE, wherein the UE capability message includes a capability of the UE to support communication using a modulation and coding scheme (MCS) that includes 64 quadrature amplitude modulation (QAM);
   encode, at the base station, a higher layer signaling message for transmission to the UE to configure the UE to operate in a CE mode A; and
   encode data to be modulated using a MCS that includes a 64 QAM, at the base station, for transmission to the UE in a physical downlink shared channel (PDSCH).

23. The at least one non-transitory machine readable storage medium in claim 22 further comprising instructions, that when executed by one or more processors at the base station, perform the following:
   encode, at the base station, downlink control information (DCI) in a MTC physical downlink control channel (MPDCCH), wherein the DCI includes a PDSCH repetition number field that indicates a repetition number of 1 for the PDSCH, when the data for the PDSCH is modulated using the 64 QAM.

24. The at least one non-transitory machine readable storage medium in claim 22 further comprising instructions, that when executed by one or more processors of a base station, perform the following:
   encode, at the base station, downlink control information (DCI) in a MTC physical downlink control channel (MPDCCH), wherein the DCI includes a MPDCCH repetition number field that indicates a repetition number of 1 for the MPDCCH, when the data for the PDSCH is modulated using the 64 QAM.

25. The at least one non-transitory machine readable storage medium in claim 22 further comprising instructions, that when executed by one or more processors at the base station, perform the following:
   encode, at the base station, downlink control information (DCI) in a MTC physical downlink control channel (MPDCCH), wherein the DCI includes a MPDCCH with a maximum number of repetitions configured in a UE-specific search space, wherein the maximum number of repetitions is less than or equal to a predefined integer, when the data for the PDSCH is modulated using the 64 QAM.

26. The at least one non-transitory machine readable storage medium in claim 22 further comprising instructions, that when executed by one or more processors at the base station, perform the following:
   encode a 5-bit modulation and coding scheme (MCS) field in a downlink control information (DCI) format 6-1A for transmission in a MTC physical downlink control channel (MPDCCH), wherein the 5-bit MCS field includes a 4-bit MCS field plus a frequency hopping flag that is interpreted as a most significant bit of the 5-bit MCS field, when a number of repetitions indicated for the PDSCH is 1, to enable a size of the DCI format 6-1A to remain unchanged.

* * * * *

UNITED STATES PATENT AND TRADEMARK OFFICE
CERTIFICATE OF CORRECTION

PATENT NO. : 10,980,086 B2
APPLICATION NO. : 16/465998
DATED : April 13, 2021
INVENTOR(S) : Qiaoyang Ye et al.

Page 1 of 1

It is certified that error appears in the above-identified patent and that said Letters Patent is hereby corrected as shown below:

In the Claims

Column 33, Line 26, "at the UE" should be removed in Claim 22.

Signed and Sealed this
Eighth Day of November, 2022

Katherine Kelly Vidal
*Director of the United States Patent and Trademark Office*